US008110639B2

(12) United States Patent
Schwab et al.

(10) Patent No.: US 8,110,639 B2
(45) Date of Patent: Feb. 7, 2012

(54) TRANSPARENT AND FLAME RETARDANT POLYSULFONE COMPOSITIONS

(75) Inventors: Thomas H. Schwab, Cumming, GA (US); Theodore Moore, Cumming, GA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 229 days.

(21) Appl. No.: 12/466,142

(22) Filed: May 14, 2009

(65) Prior Publication Data

US 2009/0283476 A1 Nov. 19, 2009

Related U.S. Application Data

(63) Continuation-in-part of application No. PCT/EP2007/062358, filed on Nov. 15, 2007.

(60) Provisional application No. 61/055,027, filed on May 21, 2008, provisional application No. 61/079,529, filed on Jul. 10, 2008, provisional application No. 60/866,332, filed on Nov. 17, 2006.

(51) Int. Cl.
*C08G 75/20* (2006.01)
*C08G 75/23* (2006.01)
*C08F 283/00* (2006.01)
*C08L 81/06* (2006.01)

(52) U.S. Cl. ............ 525/535; 525/328.5; 528/174; 528/175; 528/391

(58) Field of Classification Search ............ 525/535, 525/328.5; 528/391, 174, 175
See application file for complete search history.

(56) References Cited

U.S. PATENT DOCUMENTS

| 4,108,837 | A | 8/1978 | Johnson et al. |
| 4,116,940 | A | 9/1978 | Korshak et al. |
| 4,910,265 | A | 3/1990 | Matsumura et al. |
| 5,204,400 | A | 4/1993 | Kelly et al. |
| 5,916,958 | A | 6/1999 | Kelly et al. |
| 6,482,880 | B1 | 11/2002 | Rock |
| 6,503,988 | B1 | 1/2003 | Kitahara et al. |
| 6,593,445 | B2 | 7/2003 | Schwab |
| 2006/0041100 | A1 | 2/2006 | Cao |
| 2006/0166047 | A1 | 7/2006 | Yoshimura et al. |

FOREIGN PATENT DOCUMENTS

| EP | 1544231 A1 | 6/2005 |
| EP | 1669391 A1 | 6/2006 |
| EP | 1674498 A1 | 6/2006 |
| JP | 62010134 A | 1/1987 |
| JP | 63182339 A | 7/1988 |
| JP | 07216087 A | 8/1995 |
| JP | 20060028414 A | 2/2006 |
| JP | 20060032179 A | 2/2006 |
| WO | WO 0060009 A1 | 10/2000 |
| WO | WO 0166620 A2 | 9/2001 |
| WO | WO 2005053060 A2 | 6/2005 |

OTHER PUBLICATIONS

Standard ASTM D1238, 2004, "Test Method for Melt Flow Rates of Thermoplastics by Extrusion Plastometer", Current Ed. Approved Mar. 1, 2004, 14 pgs.
Standard ASTM D1746, 2003, "Test Method for Transparency of Plastic Sheeting", Current Ed. Approved Jul. 10, 2003, 5 pgs.
Standard ASTM D1925, 1988, "Test Method for Yellowness Index of Plastics", p. 1-3.
Standard ASTM D1003, 2000, "Test Methods for Haze and Luminous Transmittance of Transparent Plastics", Current Ed. Approved Jun. 10, 2000, 6 pgs.
Standard ASTM D256, Historical 2005 Revision A, "Test Methods for Determining the Izod Pendulum Impact Resistance of Plastics", Current Ed. Approved Nov. 1, 2005, 21 pgs.
Standard ASTM D4812, 2006, "Test Method for Unnotched Cantilever Beam Impact Resistance of Plastics", Current Ed. Approved Mar. 21, 2006, 13 pgs.
Boeing Document D6-51377, Revision F, May 2006, "Airplane fireworthiness design criteria—Pressurized compartments", p. 1-48.
Mikitaev A.K. et al., "Synthesis and properties of aromatic block polyester-polysulfones", Vysokomolekulyarnye Soedineniya, 1982, Seriya A, 24(12), p. 2558-62—CAS abstract 98:107887, 1 pg.
Emisheva I. KH. et al., "Polyarylate sulfones based on oligoarylene sulfone ether and tetrachlordian", Vysokomolekulyarnye Soedineniya, 1985, Seriya B: Kratkie Soobshcheniya, 27(7), p. 531-3—CAS abstract 103:216190, 1 pg.
Yu X. et al., "Synthesis and characterization of multiblock copolymers for proton exchange membranes", Preprints of Symposia—American Chemical Society, Division of Fuel Chemistry, 2005, 50(2), 3 pgs.
DOT/FAA/AR-00/12, "Aircraft Materials Fire Test Handbook," Apr. 2000, Federal Aviation Administration, Appendix E, Aircraft Industries International Test Methods and Guidelines, Table E-1: Industry Test Documentation, 1 pp.
Code of Federal Regulations, Title 14, Part 25, "Airworthiness Standards : Transport Category Airplanes",—last amended on Oct. 27, 2004, list of sections, retrieved online on Mar. 26, 2009 via Internet site : http://ecfr.gpoaccess.gov/cgi/t/text/text-idx?c=ecfr&sid=81df95bda6486464109af2024415a6c5&rgn=div5&view=text& node=14:1.0.1.3.11&idno=14#14:1.0.1.3.11.4.181.74.
Federal Aviation Regulation FAR 25.853 "Compartment interiors",—last amended on Oct. 27, 2004, Appendix F, Part I "Test Criteria and Procedures for Showing Compliance with §25.853", 13 pgs, retrieved online on Mar. 26, 2009 via Internet site : http://ecfr.gpoaccess.gov/cgi/text/text-idx?c=ecfr&sid=81df95bda6486464109af2024415a6c5&rgn=div5&view=text& node=14:1.0.1.3.11&idno=14#14:1.0.1.3.11.4.181.74.
Federal Aviation Regulation FAR 25.853 "Compartment interiors",—last amended on Oct. 27, 2004, Appendix F, Part IV, "Test Method to Determine the Heat Release Rate From Cabin Materials Exposed to Radiant Heat", p. 1-19 retrieved online on Mar. 26, 2009 via Internet site : http://ecfr.gpoaccess.gov/cgi/text/text-idx?c=ecfr&sid=81df95bda6486464109af2024415a6c5&rgn=div5&view=text& node=14:1.0.1.3.11&idno=14#14:1.0.1.3.11.4.181.74.

(Continued)

*Primary Examiner* — Duc Truong
(74) *Attorney, Agent, or Firm* — Oblon, Spivak, McClelland, Maier & Neustadt, L.L.P.

(57) ABSTRACT

A polysulfone having a first polyphenylene sulfone unit (i.e. PPSU unit) based on one biphenol group and one diphenyl sulfone group and a second sulfone unit (i.e. PSU-AF unit) based on one hexafluorobisphenol A group and one diphenylsulfone group. The polysulfone is transparent and has a total heat release and peak heat release of less than 65 kW·min/m$^2$ and 65 kW/m$^2$, respectively. Compositions containing the polysulfone and articles made by molding and/or extruding the polysulfone.

13 Claims, No Drawings

OTHER PUBLICATIONS

Federal Aviation Regulation FAR 25.853 "Compartment interiors",—last amended on Oct. 27, 2004, Appendix F, Part V, "Test Method to Determine the Smoke Emission Characteristics of Cabin Materials", p. 1-12 retrieved online on Mar. 26, 2009 via Internet site : http://ecfr.gpoaccess.gov/cgi/t/text/text-idx?c=ecfr&sid=81df95bda6486464109af2024415a6c5&rgn=div5&view=text& node=14:1.0.1.3.11&idno=14#14:1.0.1.3.11.4.181.74.

Boeing Specification Support Standard BSS 7238, Revision C, 19970626, "Test Method for Smoke Generation by Materials on Combustion", Rev.(C) Jun. 26, 1997, p. 1-19.

Boeing Specification Support Standard BSS 7239, Revision A, 19880118, "Test Method for Toxic Gas Generation by Materials on Combustion", Rev. (A) Jan. 18, 1988, p. 1-12.

DOT/FAA/AR-00/12, "Aircraft Materials Fire Test Handbook," Apr. 2000, Federal Aviation Administration, 235 pp.

TRANSPARENT AND FLAME RETARDANT POLYSULFONE COMPOSITIONS

CROSS-REFERENCE TO RELATED APPLICATIONS

This application claims the benefit under 35 USC 119(e) of U.S. provisional application No. 61/055,027, filed on May 21, 2008 as well as of U.S. provisional application No. 61/079,529, filed on Jul. 10, 2008 and is a continuation-in-part application of International Application No. PCT/EP2007/062358, filed on Nov. 15, 2007, which claims priority to U.S. provisional application No. 60/866,332, filed on Nov. 17, 2006, these applications being incorporated herein by reference in their entirety for all purposes.

BACKGROUND OF THE INVENTION

1. Field of the Invention

The invention is related to polysulfones that contain first and second different sulfone units as the only repeating units. The first of the repeating sulfone units of the polysulfone is a polyphenylsulfone unit based on a diphenyl sulfone and a biphenol. The second repeating unit of the polysulfone is a fluorinated polysulfone based on a diphenyl sulfone and a hexafluorobisphenol A. The invention further relates to methods of manufacturing the polysulfones, compositions containing the polysulfones, methods of using the polysulfones, and articles made from the polysulfones.

2. Description of the Related Art

Polysulfones are polymers that have repeating or recurring $—SO_2—$ groups. The term "polysulfone" is used generically to describe any polymer containing repeating or recurring units of one or more diamyl sulfone groups (e.g., monomers) of general formula $—(Ar—SO_2—Ar)—$, where Ar is a substituted or unsubstituted aryl group such as a phenyl, biphenyl, bisphenol or any other aryl group containing an aromatic hydrocarbon or hetero-aromatic ring.

Polysulfones include repeating or recurring units of a diaryl sulfone such as diphenyl sulfone (e.g., $(—C_6H_4)—SO_2—(C_6H_4)—$) bonded to a diphenol such as biphenol (e.g., $HO—(C_6H_4)—(C_6H_4)—OH$). A single diphenyl sulfone group is shown below.

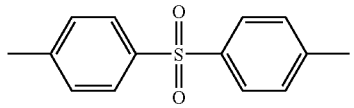

Commercially important polysulfones generally contain only a single type of diaryl sulfone group. Most polysulfones do not include sulfone groups other than a diarylsulfone (e.g., the only $—SO_2—$ groups is a diaryl sulfone group). Likewise, most polysulfones contain only a single type of diphenol such as biphenol or bisphenol A.

Well known and commercially available polysulfones include the polysulfone identified herein as PSU. PSU contains reacted units of diphenyl sulfone and bisphenol A (BPA). PSU is available commercially from Solvay Advanced Polymers (i.e., under the tradename UDEL®). The UDEL® polysulfone includes polymerized groups of diphenylsulfone and bisphenol A. The structure of the repeating unit of a UDEL® polysulfone, made by condensing bisphenol A and 4,4'-dichlorodiphenyl sulfone, is shown below. PSU has a high glass transition temperature (e.g., about 185° C.) and exhibits high strength and toughness.

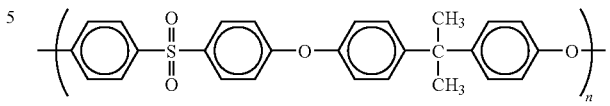

RADEL® R polyphenylsulfone is another polysulfone available from Solvay Advanced Polymers. RADEL® R polyphenylsulfone is made by reacting units of 4,4'-dichlorodiphenyl sulfone and 4,4'-biphenol. A polyphenylsulfone, such as RADEL® R, that includes reacted groups of biphenol and diphenyl sulfone is identified herein as PPSU. The chemical structure of a RADEL® R polyphenylsulfone is shown below.

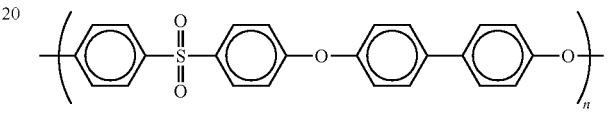

Other polysulfones include co-polymers having at least two different types of sulfone and/or diphenol groups. RADEL® A polyethersulfones, available from Solvay Advanced Polymers, include a polyethersulfone portion made from repeating or recurring groups of formula $(—Ar—SO_2—Ar—O)_n$ and a relatively lower amount of a polyetherethersulfone portion of formula $(—Ar—SO_2—Ar—O—Ar'—O—)_m$, where the polyethersulfone portion and the polyetherethersulfone portion are bonded to one another. The chemical structures of a polyether sulfone and a polyetherethersulfone portion of a RADEL® A co-polymer are shown below.

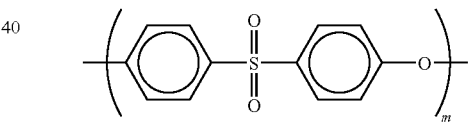
polyethersulfone

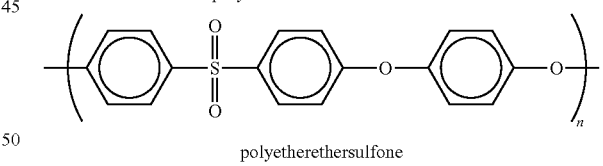
polyetherethersulfone

Polysulfones are typically amorphous and do not melt crystallize. One substantial advantage of polysulfones is their transparency. Due to their high strength and heat resistance, certain polysulfones may be used in high-stress environments where other transparent polymers such as polycarbonate may degrade or may otherwise be unsuitable. Polysulfones are particularly well suited for aircraft applications where lightness and strength are key properties. Polysulfones are used in many aircraft applications including, for example, passenger service units, staircases, window reveals, ceiling panels, information displays, window covers, ceiling panels, sidewall panels, wall partitions, display cases, mirrors, sun visors, window shades, storage bins, storage doors, ceiling overhead storage lockers, serving trays, seat backs, cabin partitions, and ducts. Transparent articles such as windows, lighting fixtures and partitions are especially well suited for polysulfones and compositions containing polysulfones.

Further advantages of polysulfones include good chemical resistance, such that polysulfones are able to withstand exposure to the types of cleaning fluids used in the aircraft industry; processability in the melt phase including injection molding and extrusion; and ease of colorability.

Polysulfones undergo thermal degradation, e.g., burning or combustion, with low smoke emission and low thermal emission. To be permitted for use inside aircraft, engineering thermoplastics, including polysulfones, must meet certain requirements for flame resistance (e.g., flame retardancy) and heat release during combustion. Air worthiness standards issued by the U.S. government and codified in Title 14 Code of Federal Regulations (51 Federal Register 26206, Jul. 21, 1986 and 51 Federal Register 28322, Aug. 7, 1986) provide flammability standards based on heat calorimetry testing. The air worthiness standards of Title 14 of the CFR are incorporated by reference herein in their entirety.

The heat calorimetry testing methodology used to determine whether an engineering thermoplastic meets U.S. government air worthiness standards were developed at Ohio State University and are known as the OSU Flammability Test. The OSU tests measure the two minute total heat release (THR) and peak heat release (HRR) in kilowatt minutes per square meter of surface area, i.e., kW·min/m$^2$, and kilowatt per square meter of surface area, i.e., kW/m$^2$, respectively, for the first five minutes of a burn test under the conditions of the OSU testing.

The most recent air worthiness standards, enacted in 1990, for engineering thermoplastics require that both THR and HRR have values of 65 or less for both THR and HRR. Some polysulfone materials such as PSU meet current air worthiness standards; however, when used as a blend with other polymers the THR and/or HRR thresholds may be exceeded. Moreover, in the future, air worthiness standards are likely to become stricter, e.g., leading to a further lowering of permissible maximum THR and/or HRR values. Further improvements in the flame resistance/flame retardancy and thermal release properties of polysulfone materials are desirable to improve aircraft safety and to permit continued use of polysulfones in the aircraft applications.

Of the polysulfones that are presently commercially available, polyphenylsulfone (PPSU) in particular provides excellent performance for aircraft applications where transparency is required. Still, the heat release properties of polysulfones that are currently commercially available are inferior to the heat release properties of other engineering thermoplastic compositions, especially opaque plastic materials and/or blends that contain one or more conventional flame retardants.

Conventional flame retardants such as triphenyl phosphate or melamine cyanurate are often mixed with conventional engineering thermoplastics to improve heat release properties and to reduce flammability. Such conventional flame retardants may be added to polysulfone compositions; however, the resulting compositions often exhibit significantly impaired transparency. For example, when added to a polysulfone, such flame retardants may not be miscible with the engineering thermoplastic and consequently impart haze and/or an opaque appearance to the polysulfone. Common flame retardants, including inorganic additives such as TiO$_2$, ZnO or Zinc borate, provide improved flame retardancy only at high loading levels with a concomitant negative effect on weight, processability and optical properties.

Fluorocarbon resins such as polytetrafluoroethylene have been used to improve the flame retardance, flame resistance and thermal release properties of conventional engineering thermoplastics such as polycarbonate. Fluorocarbon resins have also been used in combination with polysulfones. For example, U.S. Pat. No. 5,204,400 discloses flame retardant thermoplastic compositions comprising the poly(biphenylethersulfone) of formula:

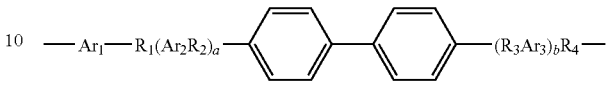

wherein R$_1$ though R$_4$ are —O—, —SO$_2$—, —S—, —C(O)—, with the provision that at least one of R$_1$ though R$_4$ is an —SO$_2$— group and that at least one of R$_1$ though R$_4$ is —O—; Ar$_1$, Ar$_2$, Ar$_3$ are arylene radicals containing 6 to 24 carbon atoms. The compositions further contain anhydrous Zinc borate and a fluorocarbon polymer present in the form of finely divided solids.

U.S. Pat. No. 5,916,958 discloses compositions comprising a poly(biphenylethersulfone) of formula:

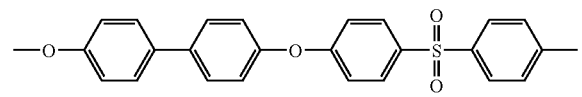

in combination with a fluorocarbon polymer and titanium dioxide. The compositions exhibited enhanced flame retardant characteristics and were described as useful for making aircraft interior parts. The fluorocarbon polymer additive is preferably a polytetrafluoroethylene (PTFE) in the form of a finely divided solid having a particle size of less than about 5 μm.

U.S. Pat. No. 6,503,988 discloses flame resistive compositions containing a flammable thermoplastic resin, a flame retardant, and a polytetrafluoroethylene fine powder comprising particles of 0.05 to 1 μm as an anti-dripping agent. Polysulfone resins are mentioned as suitable flammable thermoplastic resin.

U.S. Pat. No. 6,482,880 discloses poly(biphenylethersulfone) resins having improved resistance to yellowing that include PTFE in particulate form.

While such compositions may provide, in some cases, improved flame resistance, flame retardance, and/or reduced thermal release during combustion, the presence of the fluorinated polymer has a strongly negative effect oil the optical and appearance properties of the resulting compositions and leads to a pearlescent and/or opaque appearance. Further, the presence of a fluorinated resin makes the resulting compositions difficult to color. The increased degree of haze and other detrimental optical affects exclude the use of such compositions from applications in which transparency is required.

Thus, there is a need for transparent polysulfone materials and polysulfone-containing compositions that exhibit improved flame resistance, flame retardancy and/or lower thermal release on combustion, which concurrently have excellent optical properties, including transparency.

Polysulfones are also commonly used in the manufacture of shaped articles including purification membranes commonly used in the chemical, food, beverage, water and textile industries such as ultrafiltration, microfiltration, reverse osmosis, and gas and vapor separations membranes as well as in some healthcare treatments, i.e. hemodialysis, blood filtration, etc. . . . One problem with conventional polysulfones used in applications with service requirements including long term exposure to various solvents and chemicals, such as purification membranes, is that they suffer from poor chemical resistance, particularly to certain solvents and chemicals such as hydrocarbons. Furthermore, polysulfones are subject to plasticization when exposed to high concentrations of carbon dioxide that may be encountered during certain gas separations, severely limiting their performance.

There is thus a need for polymeric shaped articles and in particular for fibers, filaments, films, coatings and membranes with an improved chemical resistance.

In addition, purification membranes should be highly selective with respect to various separation problems, exhibit high permeation rates, high mechanical strength, high thermal and chemical resistance. Meeting all these criteria appears tricky because polymer membranes with high permeation rates have generally low selectivities while membranes with high selectivities have low permeation rates.

There is thus also a need for polymeric shaped articles and in particular for purification membranes featuring enhanced flux—selectivity trade-off. This property depends notably on the material's nature and in particular on its density and free volume characteristics. There is thus a need for high permeation rates membranes that encompass also good selectivities.

At least part, and preferably all of these needs, and possibly still other additional needs, are met by the polysulfone copolymer according to the present invention, the polymer composition (C) according to the present invention and the polymeric shaped article (A) according to the present invention comprising at least one part consisting essentially of at least one polysulfone copolymer according to the present invention or the polymer composition (C) according to the present invention.

SUMMARY OF THE INVENTION

Accordingly, in order to address the above noted deficiencies of conventional polysulfone compositions, and to provide polysulfones having low thermal release properties, it is one object of the invention to provide polysulfones that include a first sulfone unit made from diphenyl sulfone and biphenol, and a second sulfone unit made from diphenyl sulfone and hexafluorobisphenol A, where the first and second sulfone units are the only repeating or recurring units of the polysulfone.

Another object of the invention is to provide polysulfones and compositions thereof having high transparency, high flame resistance, and low thermal release on combustion.

Another object of the invention is to provide polysulfone materials having a mixed block/random structure.

Another object of the invention is to provide polymer compositions that include the polysulfones and one or more additional polymers miscible with the polysulfones.

Another object of the invention is to provide polysulfone compositions that include the polysulfones and one or more fillers or additives that are not soluble in the polysulfones.

Another object of the invention is to provide a polysulfone having a total heat release (THR) of 50 kW·min/m² or less.

Another object of the invention is to provide a polysulfone having a peak heat release (HRR) of 50 kW/m² or less.

Another object of the invention is to provide a polymer composition (C) comprising the polysulfone copolymer of the present invention.

Another object of the invention is to provide articles made from the polysulfone copolymer of the present invention.

DETAILED DESCRIPTION OF THE PREFERRED EMBODIMENTS

The polysulfones of the invention are co-polymers having two different sulfone units as the only repeating sulfone units of the polysulfone. The term "sulfone unit" is used herein to describe a recurring or repeating unit that contains a sulfone group (i.e., diphenyl sulfone) and a diphenol group (i.e., biphenol or hexafluorobisphenol A).

More precisely, the polysulfone includes recurring units of a first sulfone unit of the following formula I:

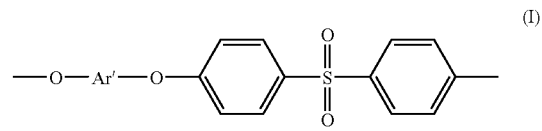

where Ar' is:

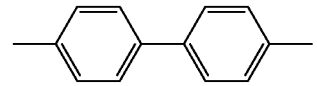

(i.e., the "PPSU unit")
and recurring units of a second sulfone unit of the formula I where Ar' is:

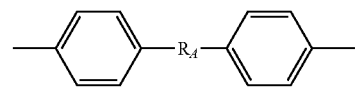

where $R_A$ is:

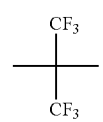

(i.e., the "PSU-AF unit").

The polysulfones of the invention have repeating or recurring units of two and only two different sulfone units. There are no other recurring or repeating sulfone units or other polymerizable monomer units present in the polysulfones of the invention. A first sulfone unit is a polyphenylene sulfone unit (i.e., PPSU unit) based on one biphenol group and one diphenyl sulfone group. In the first sulfone unit the biphenol group is 4,4'-biphenol, i.e.

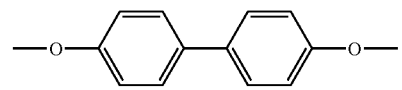

and the diphenyl sulfone group is 4,4'-diphenyl sulfone, i.e.

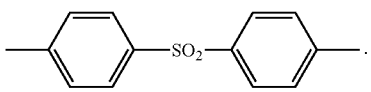

A second sulfone unit is a partially fluorinated polysulfone unit (i.e., PSU-AF unit) based on one bisphenol A group and one diphenylsulfone group. The bisphenol A group is hexafluorobisphenol A:

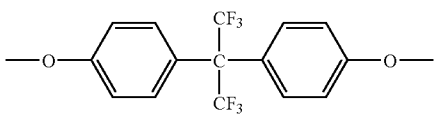

and the diphenylsulfone group is 4,4'-diphenyl sulfone, i.e.

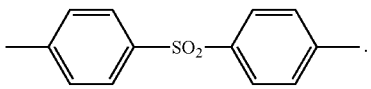

The sulfone units do not contain any other group other than the sulfone group and one of a hexafluorobisphenol A or a biphenol group.

The polysulfone of the invention is a co-polymer that contains, as sole recurring units, repeating or recurring units of the PPSU unit combined with (e.g., reacted with and chemically bonded with) repeating or recurring units of the PSU-AF unit. The polysulfone of the invention is therefore a PPSU/PSU-AF co-polymer having the following chemical formula.

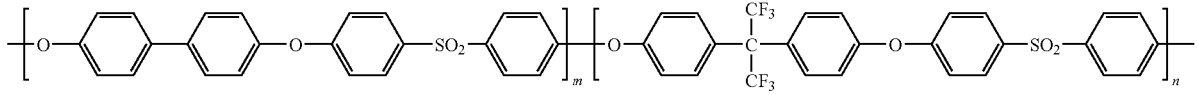

The PPSU and PSU-AF units may be present in the polysulfone of the invention in varying ratios relative to one another. In the formula above, the values for m and n may vary. In general, the first and second sulfone units may be present in a ratio of 1:0.01-100.

In one embodiment m and n are of the same order of magnitude. In said embodiment, the m/n molar ratio is advantageously of at least ½, preferably at least ⅔ and more preferably at least 9/10; besides, the m/n molar ratio is advantageously of at most 2.0, preferably at most 1.5, and more preferably at most 1.1. Excellent results were obtained when both the PPSU and PSU-AF units were present in about the same molar amount, i.e. when the m/n molar ratio was about 1.

In another embodiment of the invention the PPSU unit is present in a substantially lesser molar amount than the molar amount of the PSU-AF unit. This results in an increased amount of fluorination of the copolymer. Such copolymers may be especially preferred for improved flame resistance and flame retardance. For example, the molar ratio of PPSU:PSU-AF units may be 0.2. Accordingly, the molar ratio of m/n is usually less than ½; notably, it may be of at most 0.4, at most 0.3, at most 0.2, at most 0.1, at most 0.05, at most 0.03, at most 0.02, and at most 0.01; for example, the m/n ratio may be ⅓.

In another embodiment of the invention the PSU-AF unit is present in a substantially lesser molar amount than the molar amount of the PPSU unit. Such copolymers may be especially preferred for improved toughness and lower cost. Accordingly, the molar ratio of m/n is usually greater than 2; it may be notably of at least 2.5, at least 3, at least 4, at least 5, at least 10, at least 20, at least 30, at least 40, at least 50, at least 100; for example, the m/n ratio may be 8.

The polysulfone polymer includes, as the repeating or recurring units, only (i) PPSU units based on only 4,4'-diphenol groups and diphenylsulfone groups, and (ii) PSU-AF units based on only hexafluorobisphenol A and diphenyl sulfone, wherein the ratio of the PPSU unit and PSU unit may vary as stated above so long as no other recurring monomer units are present however terminating units such as phenols, alkoxides, halides, esters, etc., which may optionally be fluorinated, may be present.

The polysulfone co-polymer of the invention therefore consists of at least one terminal group and repeating units that include only the PPSU sulfone unit and the PSU sulfone unit. Because it is not possible to obtain any of diphenyl sulfone, biphenol, or hexafluorobisphenol A (or any derivatives or precursors of the aforementioned groups such as dichlorodiphenyl sulfone) in a form that is 100% pure and free from any contaminant, the term "consisting of", as it is used herein, does not exclude other diphenols, sulfones or other polymerizable/condensable monomer groups to the extent that such groups are present in the starting materials used to make the copolymers of the invention. For example, a co-polymer of the invention that consists of units of repeating units of only the PPSU and PSU sulfone units may include monomer groups other than biphenol, hexafluorobisphenol A and diphenyl sulfone present in amounts of no more than 5%, preferably 4%, more preferably 3%, more preferably 2% and most preferably 1% by weight based on the weight of the co-polymer, when such groups enter the co-polymer adventitiously as contaminants of the starting materials used to make the co-polymer.

The weight average molecular weight of the polysulfone of the invention may be in any range that provides for practical processing, e.g., injection molding, extrusion, sheet forming, etc., under melt or thermoforming conditions to provide molded, formed and/or extruded articles having desirable physical and mechanical properties as well as good optical properties. The weight average molecular weight of the polysulfones of the invention may range from about 10,000 to about 100,000, preferably about 40,000 to about 90,000, more preferably 50,000 to 80,000, more preferably 60,000 to 75,000, measured by gel permeation chromatography using methylene chloride as a solvent and polystyrene calibrations standards.

Melt flow rates of the polysulfones of the invention are desirably low. For example, melt flow rates of from 2-40 g/10 min are preferred, more preferably from 6-35 g/10 min, more preferably from 8-30 g/10 min, more preferably from 10-25 g/10 min, and most preferably from 14-20 g/10 min. Melt flow rates are reported as measured under the conditions of ASTM method D 1238 at a temperature of 365° C. and a load of 5 kg. Melt flow rates of greater than 15 g/10 min may also be used.

The glass transition temperature for the polysulfones of the invention may range from about 180 to about 250° C., preferably 190-240° C., more preferably 200-230° C., more preferably 205-225° C., more preferably 210-220° C.

It is preferable to have a reduced amount of hydroxyl termination because terminal hydroxyls may undergo oxidation during melt processing and thereby impart undesirable color to the polysulfone. Preferably, the amount of hydroxyl end groups is less than 10 μm eq/g, more preferably less than 5 μm eq/g, and most preferably less than or equal to 2 μm eq/g.

The fluorine content of the polysulfones of the invention is not limited and may be as much as 22 wt % based upon the total weight of the polysulfone. The fluorine is in the form of fluorine bonded to the isopropylidene groups of the hexafluorobisphenol A group. Preferably the fluorine is present in an amount of from 1-22% by weight, more preferably 3-20%, more preferably 5-18%, more preferably 6-17%, and any ranges or subranges therebetween.

The polysulfones of the invention include polymers in which the PPSU units and PSU-AF units are randomly distributed in the polymer. In other embodiments the polysulfones of the invention have a block structure wherein a first sulfone unit and a second sulfone unit appear in an irregular but predictable repeating or recurring manner. The blocks may contain repeating or recurring units of only one of the first or second sulfone groups and/or sulfone groups. For example, a block may contain at least two of the same sulfone units bonded together. The polysulfone may contain polymerized blocks of a first sulfone unit that are randomly distributed among groups of randomly polymerized first and the second sulfone units.

In one embodiment of the invention the polysulfone co-polymer contains portions of random structures and portions of block structures. The random portion of the polysulfone is a portion wherein the sulfone units are randomly distributed. The block portion of the polysulfone includes portions in which the sulfone units repeat or recur in a predictable manner.

The polysulfone co-polymer may have a structure that is from 0 to 100% random and from 0 to 100% block. Preferably the co-polymer has from 20 to 80% random structure and from 80 to 20% block structure, more preferably from 30 to 70% random structure and from 70 to 30% block structure, more preferably from 40 to 60% random structure and from 60 to 40% block structure, most preferably the polysulfone co-polymer has about 50% random structure and about 50% block structure.

In the polysulfone co-polymer containing only PPSU and PSU-AF units, the random/block structure ratio may be determined by using $^1$H and $^{13}$C NMR spectroscopy techniques. Specifically, 2D NMR spectroscopy including $^1$H-$^1$H COSY, $^1$H-$^{13}$C HSQC, $^1$H-$^{13}$C HMBC and 1D-$^1$H and $^{13}$C NMR techniques.

The structure of the block portions may be represented as described below. In the co-polymer of the invention, the diphenyl group of the sulfone may be represented as A; the biphenol group may be represented as B; and the hexafluorobisphenol A group may be represented as C. Each of A, B and C represent one molecule of the individual monomer groups of the group including diphenyl sulfone, diphenol, and hexafluorobisphenol A. Several different pentads (e.g., groups of recurring units of sulfone groups and diphenol groups) are identified in the NMR spectra including ACABA, ACACA, ABABA, and ABACA structures.

The aforementioned pentad structures represent block units can be represented as the following structures (SF-BPAF)-(SF-BP)-SF (i.e., (PSU-AF)-(PPSU)-SF); (SF-BPAF)-(SF-BPAF)-SF (i.e., (PSU-AF)-(PSU-AF)-SF); (SF-BP)-(SF-BP)-SF (i.e., (PPSU)-(PPSU)-SF); and (SF-BP)-(SF-BPAF)-SF (i.e., (PPSU)-(PSU-AF)-SF), respectively, where SF is diphenylsulfone, BPAF is hexafluorobisphenol A, and BP is biphenol. The different structures are discernable by different $^{13}$C NMR signals representing certain carbons of the diphenol group (e.g., the carbon atom of the C—O bond). Other structures including triads and quadrads, and higher structures, may also be present in the copolymers of the invention.

The hexafluorobisphenol A is preferably at least 99% isomerically pure with single hydroxyl substitution at the 4 and 4' positions of the phenyl groups. Other isomers such as 2,4'-hexafluorobisphenol A are present in amounts that are preferably less than 1% by weight. Other phenols such as phenol or fluorinated derivatives of phenol are preferably present in an amount of less than 1% by weight. Residual hydrofluoric acid (i.e., HF) is preferably present in an amount of 2 ppm or less. Likewise, non-fluorinated diphenol monomers are preferably not present at all or present in an amount of less than 1% by weight.

The structure of hexafluorobisphenol A is shown below.

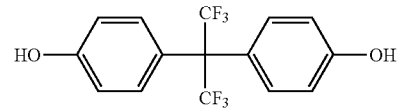

The sulfone groups of the sulfone units of the polysulfones of the invention are based on diphenyl sulfone and may be derived from a dihalodiphenylsulfone starting material, e.g., dichlorodiphenyl sulfone (DCDPS), difluorodiphenyl sulfone (DFDPS), etc.

The polysulfones of the invention may be prepared by reacting mixtures that contain a first sulfone unit and a second sulfone unit. The first and/or second sulfone unit may be prepared separately and purified before forming the co-polymer. For example, the first and/or second sulfone unit may be prepared by first reacting dichlorodiphenylsulfone and biphenol to form a precursor mixture containing discreet (e.g., not polymerized) PPSU units, and/or oligomers thereof. The PPSU unit-containing precursor mixture may then be further reacted with a mixture containing discreet PSU-AF units and/or a mixture containing a hexafluorobisphenol A derivative and diphenyl sulfone derivative to form the co-polymer.

Preferably, the PPSU and PSU-AF units are not prepared separately but instead the preparation of the co-polymer is carried out by reacting a mixture that contains all of the different diphenol groups and the diphenylsulfone groups at the same time to form a polymer containing a distribution of PPSU and PSU-AF units.

The polysulfones and polysulfone units of the invention may be made by reacting a compound having two hydroxyl groups in the form of alkali or alkaline earth metal salts with a dihalogenated diphenylsulfone such as 4,4'-dichlorodiphenyl sulfone (DCDPS). For example, the reaction may be carried out by reacting a metal salt of biphenol with dichlorodiphenylsulfone to thereby eliminate a metal halide which may be insoluble in the reaction medium. Precipitation of the resulting metal salt by-product from the reaction solution is one way to drive the reaction to completion. By carrying out the reaction of the alkali or alkaline earth salt of the biphenol with the dihalodiphenylsulfone in a non-protic solvent, displacement of the halogen substituents of the dihalodiphenylsulfone leads to the formation of a new C—O bond.

The reaction of the metal salt of biphenol with a dihalodiphenylsulfone to form the polysulfone of the invention is preferably carried out in a non-protic solvent. Because the solubility of the resulting alkali or alkaline earth metal halide side-product is very low in such solvents, it is easy to separate the polysulfone from the side product of the salt elimination reaction (e.g., the metal halide salt) after the reaction is complete. Preferably the reaction is carried out in a solvent such as a sulfoxide or sulfone solvent. The solvent may effectively dissolve both the reactants, e.g., the alkaline earth or alkali metal salts of the biphenol, and the resulting polymer.

The non-protic (e.g., aprotic) solvent is preferably a substantially anhydrous dipolar aprotic solvent such as, e.g., dimethylsulfone, diphenylsulfone, dimethylacetamide, N-methylpyrrolidinone (i.e., NMP), tetrahydrothiophene-1,1-dioxide (e.g., sulfolane), tetrahydrothiophene-1-monoxide and mixtures thereof.

The reaction of the alkali or alkaline earth metal salt of the biphenol with the dihalodiphenylsulfone is usually carried out at a temperature of from 190-250° C., preferably from about 200 to about 230° C., still more preferably about 210 to about 220° C. The reaction may be carried out for a period of from 0.5 to 3 hours.

Advantageously, the reaction is carried out under an inert atmosphere, such as nitrogen gas, argon gas or another gas that does not react with any of the starling materials, intermediates or products of the reaction.

The use of polar aprotic solvent provides another benefit. Any water formed during the reaction may form an azeotrope with a solvent. The water may later be removed as its azeotrope by distillation. In one embodiment of the invention, the distillation is carried out continuously during the polymerization reaction. When a further solvent such as an aromatic hydrocarbon, e.g., toluene, mono-chlorobenzene, xylene, and/or ethylbenzene, is present, a distillable azeotrope of the further solvent and water may be formed. As the reaction progresses under heating, the azeotrope may be continuously removed and thereby maintains an anhydrous condition during the reaction. Azeotropes of materials such as, e.g., toluene, xylene, ethylbenzene, and chlorobenzene, may be removed by distillation as the reaction proceeds.

In another embodiment of the inventive process for making the polysulfones of the invention, the synthesis of the polysulfones may be carried out in a one-step process wherein an alkaline earth or alkali metal salt of a diphenols is reacted with a dihalodiphenylsulfone in a dipolar aprotic solvent and the resulting mixture is concurrently or subsequently polymerized without isolation of any intermediate. In a corresponding two-step process, the diphenols are first converted to an alkaline earth metal salt or alkali metal salt by reaction of the diphenols with an alkaline metal or alkaline earth metal compound. The resulting solution of the metal salts of the diphenols is then mixed with a solution of the dihalodiphenylsulfone, or optionally the pure dihalodiphenylsulfone, incrementally or all at once.

In another embodiment of the invention, a molar excess of an alkali metal carbonate is reacted with a diphenol and a dihalodiphenylsulfone. The reaction may be carried out with, for example, a 25 mol % excess of the alkali metal carbonate, preferably 15 mol 1%, more preferably 10 mol %, even more preferably 5 mol % excess. The diphenol reacts in situ with the alkali metal carbonate to form an alkali metal salt and the resulting alkali metal salt reacts with the dihalodiarysulfone.

The use of an alkali metal carbonate having an average particle size of less than about 100 µm is particularly preferred. The use of an alkali metal carbonate having such a particle size permits the synthesis of the polysulfone to be carried out at a relatively lower reaction temperature with faster reaction. Similar methods of preparing polysulfones are disclosed in U.S. Pat. No. 6,593,445, incorporated herein by reference in its entirety. Sodium and potassium carbonate salts, singly or in combination, may be used to provide a polysulfone having desirable molecular weight characteristics. Higher molecular weight polysulfones may be obtained when a potassium salt is used.

After the reaction of the diphenol metal salts with the dihalodiphenylsulfone is complete, the resulting polysulfone may be end-capped with one or more compounds such as the mono-phenol mentioned herein. Preferably, the end capping includes reaction of the polysulfone with a reactive aromatic halide, or an aliphatic halide such as, e.g., methyl chloride. The end groups thus formed may include alkoxides or other ether groups.

To stop the reaction, e.g., the reaction of the diphenol metal salt with the dihalodiphenylsulfone, methyl chloride may be sparged into the reaction mixture to thereby form a terminal methoxide group on the polysulfone.

The resulting polysulfone may be isolated by devolatilization of the reaction mixture after separation of salts with or without first adding additional solvent such as sulfolane or a mixture of sulfolane with another solvent, optionally the azeotrope solvent, to fully dissolve any polysulfone and cause the precipitation of the metal halide. Alternatively, the polysulfone may be isolated by precipitation and/or coagulation by contacting the reaction mixture with a non-solvent for the polymer such as an alcohol or water, or mixtures thereof. The precipitate/coagulate may be rinsed and/or washed with demineralized water prior to drying under reduced pressure and elevated temperature. The resulting precipitate may be further processed by extruding and pelletizing. The pelletized product may subsequently be subjected to further melt processing such as injection molding and/or sheet extrusion.

The conditions for molding, extruding, and thermoforming the resulting polysulfones are well known in the art.

Advantageous properties of the polysulfones of the invention include high flame resistance, high flame retardance, low total heat release, and a low peak heat release. The polysulfones of the invention preferably have both a total heat release (THR) and peak heat release (HRR) of less than 65 kW·min/$m^2$ and kW/$m^2$, respectively, under the conditions of the OSU flammability test. More preferably the polysulfones of the invention have a THR and a HRR of less than 60, even more preferably less than 55, and more preferably less than 50, even more preferably less than 45 and preferably no more than 40 kW·min/$m^2$ and kW/$m^2$, respectively. The polysulfones of the invention preferably have a lower THR and HRR in comparison to any polycarbonate resin on a weight or molar weight basis. A polycarbonate resin is defined herein as a composition that includes polymerized non-fluorinated and/or fluorinated bisphenol monomers A separated by recurring and repeating carbonate groups. Representative commercially available polycarbonates include MAKROLON, LEXAN and CALIBRE. More preferably, the polysulfones of the invention have a lower THR and HRR in comparison to polycarbonate resins that have a like amount of fluorination on either or both of a weight or molar basis.

The polysulfones and compositions of the invention exhibit toughness and mechanical processability. The compositions are also advantageously readily melt-fabricated to produce molded articles having aesthetically pleasing surfaces. Notched Izod impact strengths are preferably from 2.0 ft-lb/in or greater.

The term transparent is used herein to describe a composition and/or article that is able to transmit image-forming light. The distinctness of the image transmitted through the composition may be used as a measure of transparency. In one sense, transparency depends on the linearity of the passage of light rays through a composition or article.

Generally, when light interacts with matter, it can be reflected, absorbed, scattered, and/or transmitted. A composition or article is generally described as "transparent" if a significant fraction of incident light is transmitted through the composition or article. An object is considered "opaque" if little or substantially no light is transmitted through it. An object is considered "translucent" if some light passes through but not in a way that a coherent image can be seen through it or transmitted through it. Typically, translucence occurs when light takes a circuitous path through the composition or article, scattering due to embedded particles, defects or grain boundaries in the composition or article.

The inventive polysulfones and compositions may be described as transparent when (1) not reflecting significant amounts of incoming light at the incident surface (i.e., advantageously less than 50%, preferably less than 30%), (2) not absorbing significant amounts of incoming light (i.e., advantageously less than 50%, preferably less than 30%), and (3) not scattering significant amounts of said incoming light (i.e., advantageously less than 50%, preferably less than 30%).

According to ASTM D 1746 (incorporated herein by reference in its entirety), transparency can be determined by small-angle scattering. A light source (1) emits a light radiation which is passed though a collimator (2) to guide incident beam towards the sample specimen (4); intensity of incident light beam (3) $I_i$ and of transmitted light (8) deflected of less than 0.1 degree $I_r$ is measured; an aperture (7) avoids reflected (5) and scattered or deflected (6) light to reach the detector (9).

Transparency is thus expressed as a percentage according to the following equation:

$$\% T = \frac{I_r}{I_i} \times 100$$

The polysulfones and compositions of the invention have a transparency of advantageously more than 40%, preferably of more than 50%, more preferably more than 60%, still more preferably of more than 65%, even more preferably of more than 70%, especially preferably more than 80% according to ASTM D 1746, when measured on sheets having a thickness of 100 μm.

Generally, compositions having a transparency of less than 40%, when measured on sheets having a thickness of 100 μm, cannot be used for aircraft applications wherein transparency is required, because of low clarity and a pearlescent opaque appearance.

The base color of any plastic is an important determinant of whether the plastic is suitable for application in transparent or certain colored applications. A colored application includes any application wherein the polysulfone is mixed with one or more dyes and/or pigments, in combination, optionally, with one or more additional colorless or colored components. The base color of a polysulfone is the color measured on the plastic before the addition of any additional component not already present in the polysulfone derived from a manufacturing process (e.g., added as a part of the polymerization and subsequent extrusion to form pellets and a plaque for measuring color).

The color of transparent polysulfones of the invention is preferably "water clear", e.g., having no detectable color. Because polysulfones may degrade during melt processing some degree of yellowing is often present in the resins. Color is often reported as a measurement of yellowness index or color factor. Color factor and yellowness index are related and may be correlated.

Yellowness index is measured by ASTM method D-1925 and is dependent upon a thickness of a sample through which a measuring beam of light is transmitted. In addition to the ASTM D 1746 method mentioned earlier for measuring transparency, light transmittance may be measured by method ASTM D-1003. Light transmittance, like yellowness index, is dependent upon the thickness of the sample through which a beam of measuring light is transmitted. Transmittance is normally measured on a plaque or chip having a thickness of 2.5 mm.

Yellowness index and color factor (e.g., batch color) can also be measured on solutions obtained from the reaction of the monomer groups to form the polysulfones of the invention. Color factors of reactor solutions diluted to 8 wt % polymer with NMP according to U.S. Pat. No. 6,593,445, are generally less than 50 (Yellowness index less than 11), preferably less than 40 (Yellowness index less than 10), and most preferably less than 30 (Yellowness index less than 9).

Due to thermal degradation during melt processing, the batch color (i.e., color factor) and/or yellowness index of plaques molded from the copolymers obtained from the reaction solution are significantly higher. Generally, color factor for a polysulfone of the invention measured on a plaque is less than 150, more preferably less than 140, 130, 120, 110, 100. Batch colors may be improved slightly by moderating the conditions under which the plaques are molded, such conditions including barrel temperature, cycle time, injection pressure and the like.

ASTM D-1003 also provides a measuring method for haze. Haze is the ratio of diffused light transmittance to the total light transmittance expressed as a percent. The haze of the polysulfones of the invention preferably less than 50%, or preferably less than 40%, more preferably, less than 30%, less than 20%, less than 15%, less than 10%, less than 8%, 9%, 7%, 6%, 5% and much preferably less than 2%.

For the purposes of this invention, by color factor for the molded resin we mean a color value determined, preferably spectrophotometrically, using as a test specimen an article made from the resin such as, for example, an injection molded plaque, an extruded article or the like. The color factor may be conveniently calculated from the tristimulus values X, Y and Z that are obtained by integrating the transmission spectrophotometric curve. Chromaticity coordinates x and y for a sample are determined as follows:

$$x = \frac{X}{X+Y+Z}$$
$$y = \frac{Y}{X+Y+Z}$$

Chromaticity coordinates define the as-measured color of the sample; color factor defines the color of the sample per unit of sample thickness. Color factor is determined by:

$$\text{Color factor} = \frac{((x+y) - 0.6264) \times 270}{\text{thickness}}$$

wherein "thickness" is the thickness of the specimen in inches. Where the specimen is a molded article having irregular shape, the thickness value will be the thickness of the portion of the test specimen presented to the spectrophotometer. Color factor for the molded resin may also be measured if desired using other methods that will provide equivalent color factor values. The poly(biphenyl ether sulfones) of this invention may also be characterized by the color of the as-produced resin wherein the transmission chromaticity values for a solution of the resin in a specified solvent at a standardized concentration are determined spectrophotometrically using a cuvette of known thickness. Measured at a concentration of 8 wt % in a solvent mixture of monochlorobenzene, sulfolane and N-methylpyrolidone, at a 3:2:2 ratio by weight, the invented poly(biphenyl ether sulfone) resins will have a solution color factor as-produced of up to about 50, preferably up to about 40. More particularly, the solution color factor will lie in the range of from about 10 to about 50, preferably from about 5 to about 40. Poly(biphenyl ether sulfones) having a solution color factor in the range of from about 20 to about 40 will also be highly desirable and acceptable for most applications. The solution color factor or batch color may be conveniently employed for quality control purposes in the production of poly(biphenyl ether sulfones).

It is another object of the present invention to provide a polymer composition (C) comprising at least one polysulfone copolymer (in accordance with the present invention) as above described.

The polymer composition (C) may further include additional ingredients such as fillers, lubricants, mould releases, antistatic agents, flame retardants, anti-fogging agents, matting agents, pigments, dyes and optical brighteners. Such additional ingredients may also be another polymeric material such as a thermoplastic material. Preferably, such additional ingredients can be finely and homogeneously dispersed in the invented polysulfone copolymer.

The weight of the optional ingredients, based on the total weight of the polymer composition (C), is advantageously below 75%, preferably below 50%, more preferably below 25% and still more preferably below 10%. Good results were even obtained when the material was essentially free, or even completely free, of said optional ingredients.

The polysulfone copolymer of the polymer composition (C) is present in an amount of advantageously at least 20 wt. %, preferably of at least 40 wt. %, more preferably at least 60 wt. %, and most preferably at least 80 wt. %.

A particular embodiment of the present invention concerns a polymer composition (C) comprising at least one polysulfone copolymer (in accordance with the present invention) as above described, and at least one two-phase siloxane-polyarylene polyether block copolymer comprising (A) at least one siloxane chain having at least two siloxane units represented by the formula:

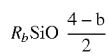

wherein R is (i) a monovalent hydrocarbon group (said monovalent hydrocarbon group can be unsubstituted or substituted; when R is substituted by one or more substituents, each substituent may be notably a halogen atom, an oxygen atom of an epoxy group or a hydroxy, cyano, alkoxy, amino, amido, isocyanato, nitro, or ester group), (ii) a divalent organic group (e.g. a divalent hydrocarbon group, a hydroxy-substituted divalent hydrocarbon group or a divalent hydrocarbon group linked to a carbonyl group), or (iii) ether oxygen (—O—), and b has a value from 1 to 3 inclusive, said siloxane chain containing at least one of said siloxane units wherein at least one R is a divalent organic group or ether oxygen (—O—) which links the siloxane chain to a polyarylene polyether chain by a carbon to silicon bond when R is a divalent group or by an aryloxy to silicon bond when R is ether oxygen, and (B) at least one linear thermoplastic polyarylene polyether chain composed of recurring units having the formula:

—O-E-O-E'- wherein E is the residuum of a dihydric phenol and E' is the residuum of a benzenoid compound having an inert electron withdrawing group (which has advantageously a sigma* value above +0.7) ortho or para to the valence bonds, both of said residua being valently bonded to the ether oxygens through aromatic carbon atoms, said siloxane chain and said polyarylene polyether chain each having a molecular weight such that the copolymer is a two phase polymeric material.

Such a two-phase siloxane-polyarylene polyether block copolymer has been extensively described in GB 1 268 093 and its U.S. Pat. No. 3,539,657 (assigned to Union Carbide Corporation), the whole content of both patent titles being herein incorporated by reference.

The two-phase siloxane-polyarylene polyether block copolymer contained in the polymer compositions in accordance with the present invention is preferably linear. Preferably, the siloxane is present in an amount of at least 10 percent by weight and said copolymer is an elastomeric material, and, more preferably, siloxane is present in an amount of 25 at least 50 percent by weight and each chain of the copolymer has a molecular weight in the range of 5000-20,000. The siloxane chain is preferably polydimethylsiloxane. In a particular embodiment the siloxane chain of the two-phase siloxane-polyarylene polyether block copolymer contains olefinic unsaturation. In another embodiment (PE) to which preference is given, the polyarylene polyether chain of the two-phase siloxane-polyarylene polyether block copolymer is composed of recurring units having the formula:

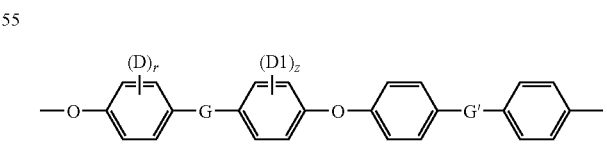

in which G represents a bond between aromatic carbon atoms or a divalent connecting radical; G' represents a sulfone, carbonyl, vinyl, sulfoxide, azo, saturated fluorocarbon, organic phosphine oxide or ethylidene group; D and $D_1$ each represent a halogen atom or an alkyl or alkoxy group having from 1 to 4 carbon atoms; and r (the subscript of D) and z (the subscript of $D_1$) are 0 or integers from 1 to 4 inclusive. In said embodiment (PE), the polyarylene polyether chain is preferably composed of recurring units having the formula:

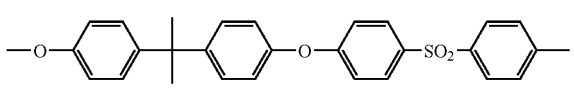

or of recurring units having the formula:

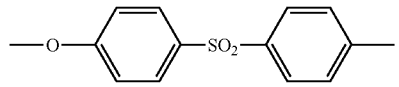

Still in said embodiment (PE), it is preferred that the siloxane be linear and the copolymer is of the $(AB)_n$ type wherein A represents said polyarylene polyether chain, B represents said siloxane chain and M is an integer having a value of 1 or greater, and it is very preferred that the siloxane be linear and the copolymer be of the A-B-A type wherein A represents said polyarylene polyether chain and B represents said siloxane chain. The two-phase siloxane-polyarylene polyether block copolymer as above described is preferably prepared by a process which comprises reacting an amine terminated siloxane chain and a hydroxyl terminated linear thermoplastic polyarylene polyether chain composed of recurring units having the formula

—O-E-O-E'- wherein E is the residuum of a dihydric phenol and E' is the residuum of a benzenoid compound having an inert electron withdrawing group having a sigma* value above +0.7 ortho or para to the valence bonds, both of said residua being valently bonded to the ether oxygens through aromatic carbon atoms, said siloxane chain and said polyarylene polyether chain each having a molecular weight such that the copolymer is a two-phase polymeric material.

The Applicant has surprisingly found that combining the polysulfone copolymer of the present invention with the two-phase siloxane-polyarylene polyether block copolymer resulted in a polymer composition which exhibited a further improved flame retardancy.

Good results were obtained notably with a polymer composition including, in addition to the polysulfone copolymer as above described, at least one polysiloxane-poly(aryl ether sulfone) copolymer, wherein:

the poly(aryl ether sulfone) recurring units comprised at least one sulfonyl group in-between two arylene groups and at least one ether group and were preferably bisphenol A polysulfone units of formula:

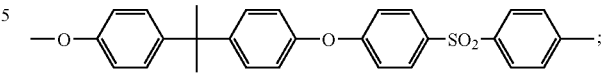

the polysiloxane recurring units were preferably p-phenylene dimethylsiloxy units of formula:

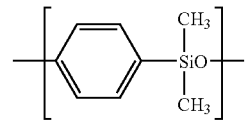

the two-phase siloxane-polyarylene polyether block copolymer had preferably a weight average molecular weight of about 1500 to 50,000 g/mol, the two-phase siloxane-polyarylene polyether block copolymer contained preferably from 10 to 90 wt. % of the siloxane and from 90 to 10 wt. % of the polysulfone, based on the total weight of the recurring units.

Excellent results were obtained when the polymer composition (C) included, in addition to the polysulfone copolymer as above described, at least one polysiloxane-poly(aryl ether sulfone) copolymer, wherein said two-phase siloxane-polyarylene polyether block copolymer had a weight average molecular weight of about 1,500 to 50,000 g/mol, and was of formula:

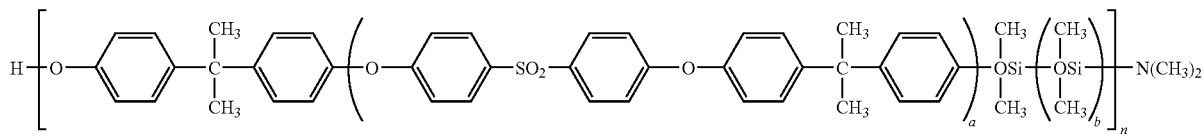

wherein a, b and n are integers $\geq 1$ and wherein the polydimethylsiloxane and the bisphenol A polysulfone recurring units are contained in the block copolymer in a weight amount of from 10:90 to 90:10, based on the total weight of the recurring units.

The polymer compositions (C) in accordance with the present invention may be free of any two-phase siloxane-polyarylene polyether block copolymer. Alternatively, as above explained, they may contain at least one such block copolymer. The case being, good results were obtained notably when the amount of the two-phase siloxane-polyarylene polyether block copolymer in the polymer compositions was such that said polymer compositions has a blend Si content of below 10 wt. %, preferably below 5.0 wt. %, more preferably below 3.0 wt. % and still more preferably below 2.0 wt. %; good results were also be obtained when the amount of the two-phase siloxane-polyarylene polyether block copolymer in the polymer compositions was such that said polymer compositions had a blend Si content of at least 0.1%, preferably of at least 0.2%, and more preferably above 0.5%.

A further aspect of the present invention is related to a shaped article (A), which is all essentially at most two-dimensional shaped article, comprising at least one part consisting essentially of the polysulfone copolymer according to the present invention.

From a practical point of view, any shaped article is three-dimensional, and can thus be characterized notably by three characteristic dimensions ("length", "width" and "height"). However, some shaped articles are such that one or two of their characteristic dimensions is (are) considerably lower than respectively the other two ones or the third one. Here and wherever else used in the present description, the terms "considerably lower" should generally be understood as "more than 5 times lower" and preferably as "more than 10 times lower", unless they characterize a "two-dimensional thickness" as defined hereafter in the description.

The shaped article (A) of the present invention includes thus essentially one-dimensional shaped articles and essentially two-dimensional shaped articles.

Precisely, for the purpose of the present invention an essentially two-dimensional shaped article is intended to denote a shaped article of which one of its characteristic dimensions ("thickness-height") is considerably lower than its other two ones ("width" and "length"), while an essentially one-dimensional shaped article is intended to denote a shaped article of which two out of its characteristic dimensions ("thickness-width" and "thickness-height") are considerably lower than its third one ("length"). Otherwise said, from a mathematic point of view, essentially two-dimensional articles have essentially the appearance of a geometric surface, while essentially one-dimensional articles have essentially the appearance of a geometric line. Thus, an essentially two-dimensional article can be viewed as a surface (with a certain length and a certain width) differing from a geometric surface in that it has a certain non-zero thickness (typically in a direction perpendicular to the surface), said non-zero thickness being however considerably lower than the square root of the surface area developed by the surface itself and, more precisely, said non-zero thickness being considerably lower than both the length and the width of the surface itself; an essentially one-dimensional article can be viewed as a line (of a certain length) differing from a geometric line, essentially in that it has a non-zero "two-dimensional thickness" (typically in a plane perpendicular to the line, with a certain non-zero thickness-width and a certain non-zero thickness-height as characteristic dimensions), said non-zero two-dimensional thickness being however considerably lower (here specifically, the terms "considerably lower", which characterize a two-dimensional thickness, should generally be understood as "more than 25 times lower" and preferably as "more than 100 times lower") than the square of the length of the line itself, more precisely, said non-zero thickness-width and said non-zero thickness-height being both considerably lower than the length of the line itself. The geometric surface can be curved or plane, twisted or untwisted; the geometric line can be a straight line or a curved line.

Thus, within the meaning of the present invention, an essentially at most two-dimensional shaped article can be either an essentially two-dimensional shaped article or an essentially one-dimensional shaped article.

The thickness of a shaped article of a regular or irregular volume is preferably defined as: $t = \int V \tau(x,y,z) \, dx \, dy \, dz/V$, wherein x, y and z are the coordinates of an elementary volume dV (dV being equal to dx times dy times dz) of the shaped article of overall plain volume V, and τ is the local thickness.

The local thickness τ, associated to a material point of coordinates (x,y,z), is defined as the length of the shortest straight line D including the material point of concern, which goes right through the shaped article (i.e. which goes from the material point where D enters the shaped article to the material point where D exits the shaped article).

Shaped article (A) has a thickness t advantageously lower than 100 mm.

A first preferred shaped article (A) is essentially two-dimensional [shaped article (A1)].

The thickness t of shaped article (A1) complies preferably with the relationship:

$$t < (V/k^2)^{1/3} \text{ [which is equivalent to } V > (k \cdot t) \cdot (k \cdot t) \cdot t] \quad \text{(rel-1)}$$

wherein V is the overall plain volume of the shaped article and k is equal to 10, t is expressed in mm and V is expressed in mm³.

The thickness t of shaped article (A1) complies very preferably with above relationship (rel-1), except k is now equal to 100.

In addition, the thickness t of shaped article (A1) complies preferably with the relationship $$t < (S/2)^{1/2}/k \text{ [which is equivalent to } S > 2 \cdot (k \cdot t) \cdot (k \cdot t)] \quad \text{(rel-2)}$$

wherein S is the overall surface area developed by the shaped article, k is equal to 10, t is expressed in mm and S is expressed in mm².

The thickness t of shaped article (A1) complies very preferably with above relationship (rel-2), except k is now equal to 100.

In a first preferred variation of shaped article (A1), shaped article (A1) is chosen from articles having a thickness lower than 500 μm [shaped article (A1-1)]. Shaped article (A1-1) is commonly referred to as a film. The film may feature a porous structure. It can in particular be a membrane. The shaped article (A1) according to the present invention is especially well suited for its use as membrane or membrane structural element. Shaped article (A1-1) has a thickness of preferably less than 250 μm. Shaped article (A1-1) has a thickness of preferably more than 5 μm. Shaped article (A1-1) complies preferably with relationship (rel-1) in which k has been changed to 1000. Very preferably, it complies with relationship (rel-1) in which k has been changed to 10000.

Shaped article (A1-1) is preferably flexible. It is sometimes very preferred that article (A1-1) can be flexed in such a way that it can get the appearance of a parallelepiped rectangle-like volume the thickness of which is considerably lower than its length and its width; roughly speaking, it looks then like a "plane with an extremely low thickness". Shaped article (A1-1) can be an uncoated film.

Alternatively, shaped article (A1-1) can be a film coated on an essentially two- or on a three-dimensional substrate. The essentially two- or the three-dimensional substrate can be notably a fabrics, a polymeric film free of polymer (P), a sheet of paper, a wood or a metal component.

An embodiment of article (A1-1) is one wherein the substrate is a metal component.

Another embodiment of article (A1-1) is one wherein the substrate differs from a metal component. According to this embodiment, preferred substrates are fabrics, end polymeric films free of polymer (P).

Shaped article (A1-1) can be a membrane, and in particular a porous membrane. In pharmaceutical manufacturing, membranes allow the removal of molecules, particles, viruses, colloids, bacteria, and other types of cellular organisms from solutions. They are used to concentrate and purify a wide variety of biological and chemical process fluids, to concentrate and purify or remove viruses and other colloid suspensions, and to remove very fine particulate contamination for fluid clarification. Microfiltration is the process of removing contaminants in the 0.025 to 10.0 μm range from fluids by passage through a microporous medium such as a membrane filter. Although micron-sized particles can be removed by use of non-membrane or depth materials such as those found in fibrous media, only a membrane filter, having a precisely defined pore size, can ensure quantitative retention. Ultrafiltration is the process of separating extremely small particles and dissolved molecules from fluids. The primary basis for separation is molecular size although secondary factors such as molecule shape and charge can play a role. Materials ranging in size from 1,000 to 1,000,000 molecular weight are retained by ultrafiltration membranes, while salts and water will pass through. Colloidal and particulate matter can also be retained. Ultrafiltration membranes are used to purify and collect both material passing through the filter and material retained by the filter. Materials smaller than the pore size rating pass through the filter and can be depyrogenated, clarified and separated from high molecular weight contaminants. Materials larger than the pore size rating are retained by the filter and can be concentrated or separated from low molecular weight contaminants. Ultrafiltration membranes are usually operated in a tangential flow mode—feed material sweeps tangentially across the upstream surface of the membrane as filtration occurs—thereby maximizing flux rates and filter life. These systems offer the advantage of long life because ultrafiltration membranes can be repeatedly regenerated with strong cleaning agents, which is one of the reasons why there is a strong need for purification membranes featuring an improved chemical resistance.

The shaped articles (A1-1) of the present invention exhibit improved properties when compared to conventional hydrocarbon based polysulfones in membrane applications such as ultrafiltration, microfiltration, hemodialysis, and reverse osmosis.

As such, the shaped articles (A1-1) of this invention find also useful applications in gas and vapor separations such as: the generation of purified oxygen or nitrogen from air; removal of carbon dioxide or hydrogen sulfide from natural gas or exhaust (stack) gases (optionally combined with a carbon dioxide sequestration technology); recovery of hydrogen from "synthesis" gases, ammonia purge gases, or hydrocarbon mixtures; separation of hydrocarbon mixtures, for example alkenes from alkanes; or separation of alcohols from water using a "pervaporation" process, for example, ethanol from water.

In a second preferred variation of shaped article (A1), shaped article (A1) is chosen from shaped articles having a thickness from 500 µm to 5000 µm [shaped article (A1-2)].

Shaped article (A1-2) has preferably the appearance of a parallelepiped rectangle-like volume the thickness of which is considerably lower than its length and its width; roughly speaking, it looks then like a "plane with a very low thickness". Then, shaped article (A1-2) is commonly referred to as a sheet.

In a third preferred variation of shaped article (A1), shaped article (A1) is chosen from shaped articles having a thickness above 5000 µm [shaped article (A1-3)].

Shaped article (A1-3) has preferably the appearance of a parallelepiped rectangle-like volume the thickness of which is considerably lower than its length and its width; roughly speaking, it looks then like a "plane with a low thickness". Then, shaped article (A1-3) is commonly referred to as a slab.

Shaped article (A1-3) is advantageously rigid.

In a fourth preferred variation of shaped article (A1), shaped article (A1) is a hollow body [shaped article (A1-4)].

The thickness of the walls of shaped article (A1-4) is advantageously equal to the thickness t of shaped article (A1-4).

Shaped article (A1-4) has a thickness t of preferably at least 250 µm, more preferably at least 500 µm. Shaped article (A1-4) has a thickness t of preferably at most 5000 µm, more preferably at most 2500 µm.

A second preferred shaped article (A) is essentially one-dimensional [shaped article (A2)]. Shaped article (A2) has a thickness t which is preferably lower than 10 mm, more preferably less than 250 µm, still more preferably less than 50 µm, and the most preferably less than 10 µm.

The thickness t of shaped article (A2) complies preferably with the relationship:

$$t < (V/k')^{1/3} \text{ [which is equivalent to } V > (k' \cdot t) \cdot t \cdot t] \tag{rel-3}$$

wherein k' is equal to 10, V as above defined, t is expressed in mm and V is expressed in mm³.

The thickness t of shaped article (A2) complies very preferably with above relationship (rel-3), except k' is now equal to 100. The thickness t of shaped article (A2) complies still more preferably with above relationship (rel-3), except k' is now equal to 1000.

The thickness t of shaped article (A2) complies the most preferably with above relationship (rel-3), except k' is now equal to 10000.

In addition, the thickness of shaped article (A2) complies preferably with the relationship $$t < (S/k')^{1/2}/2 \text{ [which is equivalent to } S > 4 \cdot (k' \cdot t) \cdot t] \tag{rel-4}$$

S as above defined, k' is equal to 10, t is expressed in mm and S is expressed in mm².

The thickness t of shaped article (A2) complies very preferably with above relationship (rel-4), except k' is now equal to 100. The thickness t of shaped article (A2) complies still more preferably with above relationship (rel-4), except k' is now equal to 1000. The thickness t of shaped article (A2) complies the most preferably with above relationship (rel-4), except k' is now equal to 10000.

In a first preferred variation of shaped article (A2), shaped article (A2) has the appearance of a cylinder-like plain volume the diameter of which is considerably lower than its length; roughly speaking, it looks then like a "straight line with an extremely low diameter" [shaped article (A2-1)]. Shaped article (A2-1) is commonly referred to as a filament.

For certain variations of shaped article (A2), in particular when shaped article (A2) is a filament, good results can be obtained notably when shaped article (A2) consists essentially of, or even consists of, polymer composition (C).

In a second preferred variation of shaped article (A2), shaped article (A2) is a coating coated on an essentially one-dimensional substrate, like an inorganic fiber, a polymeric fiber free of polymer composition (C) or a metal [shaped article (A2-2)]. Shaped article (A2-2) has then preferably the appearance of a circular crown surrounding a cylinder-like plain volume composed by the essentially one-dimensional substrate, the thickness of the crown being considerably lower than the length and the diameter of the cylinder-like plain volume.

The thickness t of shaped article (A2-2) is still more preferably less than 50 µm, and the most preferably less than 10 µm.

The shaped article (A) according to the present invention may comprise various parts, each of them consisting essentially of at least one polysulfone copolymer according to the present invention or the polymer composition (C) according to the present invention.

Membranes according to the present invention allow an improved trade off between gas permeability and gas pair selectivity.

Still a further embodiment according to the present invention is related to the use of the membrane according to the present invention in ultrafiltration, microfiltration, and reverse osmosis applications.

The membranes according to the present invention can be manufactured using any of the conventionally know membrane preparation methods. As non limiting examples, these membranes may be prepared as flat sheets, hollow fiber modules, or spiral wound elements. They may be applied to a porous support (prepared in a previous step or concurrently), and/or be subjected to post-treatments known in the art designed to improve membrane performance.

The polysulfones of the invention and compositions containing the polysulfones of the invention provide a combination of excellent mechanical properties and excellent chemical resistance, while concurrently providing excellent optical properties (transparency, color and/or colorability) and have low thermal emission when tested under the OSU conditions. The polysulfones of the invention and compositions containing the polysulfones undergo melt-fabrication at moderate conditions to provide molded and extruded articles having smooth and aesthetically pleasing surface characteristics. The polysulfones of the invention are advantageously readily pigmented in a wide range of colors, and are useful in a number of applications, in particular for the construction of various panels and parts for aircraft interiors.

EXAMPLES

First Set of Examples

A series of experiments were carried out to synthesize different polysulfones of the invention. The examples below were synthesized according to the procedures of U.S. Pat. No. 6,593,445. Different polysulfones containing PPSU and PSU-AF sulfone units as the only repeating and/or recurring groups were made. The properties of the resulting copolymers are shown in the table below.

The yellowness index and color factor for a series of copolymers containing PPSU units and PSU-AF units are compared in the table below. The color data for the samples below were measured on liquid samples taken from reaction solutions obtained by reacting biphenol, 4,4'-dichlorodiphenylsulfone and hexafluorobisphenol A, in the presence of potassium carbonate. Yellowness index was measured according to ASTMD 1925. Batch color is obtained by measuring the color factor.

TABLE 1

Correlation of PPSU/PSU-AF Batch Color vs Yellowness Index Measurements on Reactor Solutions)

| Experiment No. | PPSU/PSU-AF molar ratio | Batch Color | Yellowness Index (D1925) | BC/YI Ratio |
|---|---|---|---|---|
| 1 | 50/50 | 22 | 8.99 | 2.45 |
| 2 | 50/50 | 24 | 9.11 | 2.63 |
| 3 | 50/50 | 40 | 10.49 | 3.81 |
| 4 | 50/50 | 55 | 11.22 | 4.90 |
| 5 | 50/50 | 67 | 11.56 | 5.80 |
| 6 | 50/50 | 70 | 11.70 | 5.98 |
| 7 | 50/50 | 72 | 11.85 | 6.08 |

Polysulfone co-polymers consisting of PPSU units and PSU-AF units were measured for THR and HRR under OSU test conditions. The results are tabulated below.

TABLE 2

PPSU/PSU-AF Flammability Data

| Experiment No. | Copolymer | Copolymer Composition (mole %) | Fluorine Content (wt %) | OSU Data Peak Heat Release (kW/m$^2$) |
|---|---|---|---|---|
| Control | PPSU | 100/0 | 0 | 62.1 |
| 8 | PPSU/PSU-AF | 90/10 | 2.74 | 44.1 |
| 9 | PPSU/PSU-AF | 80/20 | 5.30 | 39.9 |
| 10 | PPSU/PSU-AF | 75/25 | 6.51 | 42.2 |
| 11 | PPSU/PSU-AF | 50/50 | 11.99 | 33.7 |
| 12 | PPSU/PSU-AF | 25/75 | 16.67 | 28.4 |

A polysulfone co-polymer of the invention consisting of PPSU units and PSU-AF units in a 50:50 molar ratio was measured for IZOD impact. The results are tabulated below.

TABLE 3

IZOD Impact for a PPSU/PSU-AF Copolymer (50/50 Mole Ratio)

| Izod Impact Strength: | | | PPSU/PSU-AF 50:50 molar ratio | PPSU 100% |
|---|---|---|---|---|
| Notched | D-256 | ft-lb/in | 2.1[1] | 13.0 |
| Unnotched | D-4812 | ft-lb/in$^2$ | NB[2] | NB |

[1]Number of bars complete break = 5.
[2]Number of bars no break (NB) = 5.

Co-polymer plaques molded from a polysulfone of the invention having a 50:50 molar ratio of PPSU/PSU-AF units were tested for vertical ignition properties, smoke emission and toxic gas generation characteristics. Testing for determination of heat release (e.g., THR and HER) was carried out. Acceptance criteria for smoke and toxicity were specified by Boeing Document D6-51377, Revision E, incorporated herein by reference.

A 60 second vertical ignition was conducted as described in FAR 25.853(a), Amendment 25-83, Appendix F, Part I, incorporated herein by reference. During the 60 second vertical ignition test, no dripping was observed and the time to extinguish was less than 1 second. The burned length of the three samples was an average of 2.8 inches. The values obtained for the polysulfone of the invention may be compared with acceptable criteria defined as follows maximum allowed time to extinguish=15 seconds, the maximum burned length=6 inches and the maximum allowed drip time to extinguish=3 seconds.

Heat release testing was conducted in accordance with FAR 25.853(d), Amendment 25-83, according to Appendix F, Part IV, incorporated herein by reference. The average value of peak heat release rate for the heat release rate testing according to FAR 25.853(d), Amendment 25-83, Appendix F, Part IV, as described in DOT/FAA/AR-00/12, as presented in the "Aircraft Materials Fire Test Handbook," dated April 2000, incorporated herein by reference, was used to generate the data of Table 2.

Smoke testing was performed according to FAR 25.853(d), Amendment 25-83, Appendix F, Part V and BSS 7238, Revision C, each of which is incorporated herein by reference. The smoke emission test showed that the copolymer of the invention, i.e., the copolymer from which the plaques were made, had an average value of 1. This compares to a maximum allowed average value for specific optical density of smoke of 200.

Toxic gas generation was tested for BSS 7239, Revision A, incorporated herein by reference. Testing of the copolymer of the invention generated 30 ppm of CO, 2 ppm of HCl, no $NO_x$ and no HCN were detected, 20 ppm of $SO_2$, and 10 ppm of HF. The specification, i.e., Boeing Document No. D6-51377, Revision E, Table 1, provides a maximum allowable toxic gas generation values in ppm for CO=3,500 ppm, HCl=500 ppm, $NO_x$=100 ppm, HCN=150 ppm, $SO_2$=100 ppm and HF=200 ppm.

Each of the sample plaques met the requirements for 60 second vertical ignition burn, heat release, smoke emission, and toxic gas emission defined in the above-mentioned tests and/or Boeing Document Nos.

Second Set of Examples

Blends composed of a PPSU/PSU-AF copolymer having a 50:50 PPSU/PSU-AF molar ratio (as the copolymer of example 11) and of a polysulfone-polydimethylsiloxane (PSU/PDMS) block copolymer were prepared. The PSU/PDMS content of the blends was made to vary from 0 to 2.0 wt. %, based on the combined weight of the PPSU/PSU-AF copolymer and the PSU/PDMS block copolymer.

The 50/50 mole ratio PPSU/PSU-AF copolymer used in the present examples exhibited the following molecular weight data by GPC measurement using polystyrene calibration standards: $M_w$=70,295 g/mole; $M_n$=25,478.

The PSU/PDMS block copolymer used in the present examples was of the following structure:

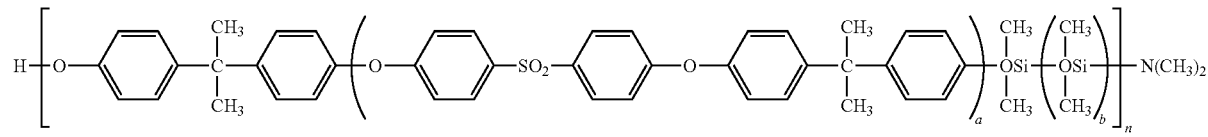

It contained nominally 12 mole % PSU and 88 mole % PDMS. The (theoretical) calculated Si content was 26.87% by weight. The Si content was effectively measured to be 21.39 wt. % by ashing the sample in the presence of concentrated sulfuric acid at 300° C., then heating to 550° C. overnight to remove residual carbon, followed by ICP Spectrometry analysis.

The way to synthesize the exemplified PSU/PDMS block copolymer is described in details from columns 10 to columns 12 of U.S. Pat. No. 3,539,657. A simple flow diagram is shown below:

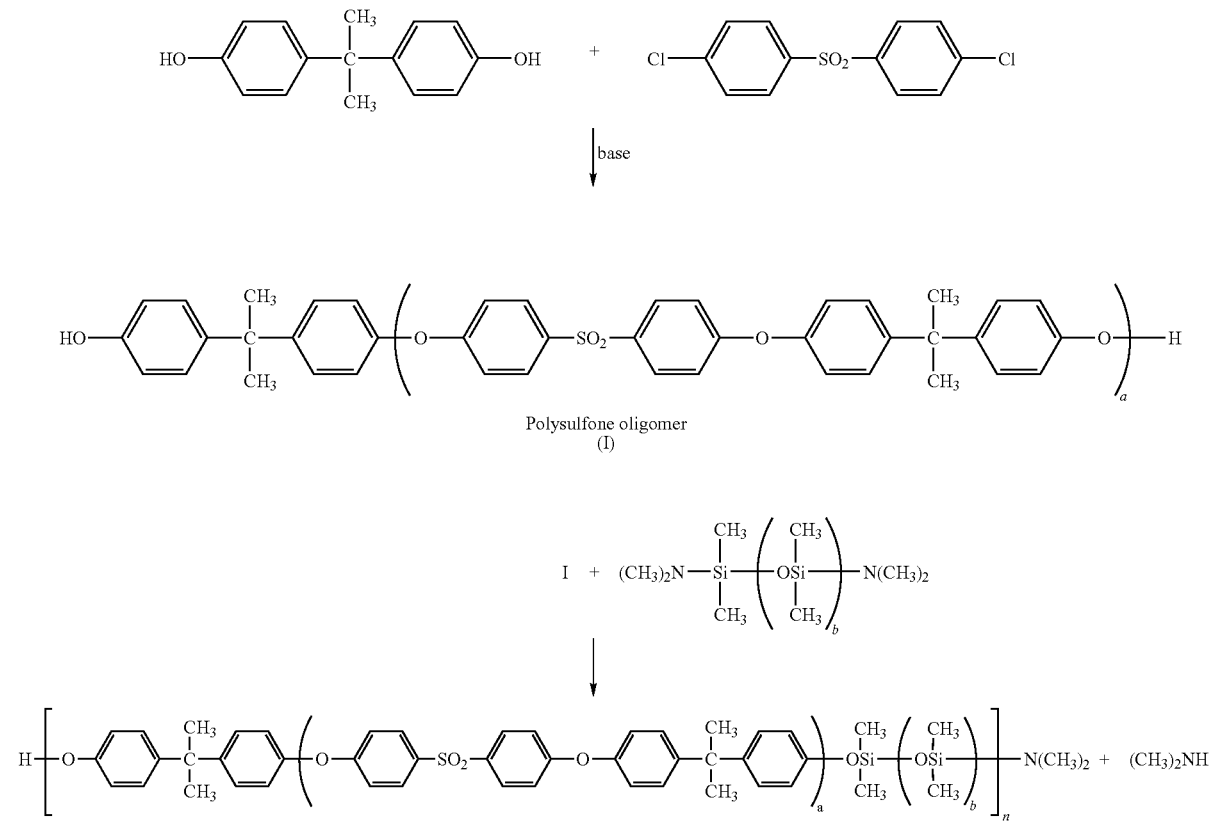

The molecular weight of the PSU/PDMS copolymer was measured by GPC using polystyrene standards for calibration: $M_w$=130,475 g/mole, $M_n$=32,113 g/mole. The copolymer end-group was as follows: phenolic hydroxyls=162 μeq/g, sulfone hydroxyls=4 μeq/g and chlorines=18 μeq/g.

The blends of the PPSU/PSU-AF copolymer with the PSU/PDMS block copolymer, were made by co-coagulation. The PPSU/PSU-AF copolymer was in the form of a 15 wt. % solution in monochlorobenzene (MCB)/sulfolane where the ratio of MCB:sulfolane was 1.5:1. The PSU/PDMS block copolymer was in the form of a 10 wt. % solution in MCB. The two solutions, in the appropriate ratios, were precipitated/coagulated from solution using methanol as the non-solvent. The ratio of methanol to polymer solution was 4:1.

The OSU following flammability test results (same test conditions as above described) are reported in Table 4 below:

TABLE 4

OSU Flammability Data for Blends of Polysulfones with PSU/PDMS Block Copolymer

| Polysulfone copolymer Component | Blend Si Content (wt %) | OSU Data Peat Heat Release (kW/m²) | OSU Data Two Minute Total Heat Release (kW-min/m²) |
|---|---|---|---|
| 50/50 PPSU/PSU-AF | None | 36.4 | 29.7 |
| 50/50 PPSU/PSU-AF | None | 43.3 | 21.1 |
| 50/50 PPSU/PSU-AF | 0.5 | 32.9 | 21.6 |
| 50/50 PPSU/PSU-AF | 1.0 | 23.6 | 19.8 |
| 50/50 PPSU/PSU-AF | 2.0 | 28.9 | 23.7 |
| 50/50 PPSU/PSU-AF | 2.0 | 29.3 | 28.8 |
| 50/50 PPSU/PSU-AF | 2.0 | 27.4 | 24.7 |
| 50/50 PPSU/PSU-AF | 4.0 | 46.1 | 47.8 |

As shown above by the examples and as explained in the detailed description of the invention, the polysulfones of the invention, which contain as repeating or recurring units only a first sulfone unit of diphenyl sulfone and biphenol, and a second sulfone unit of diphenyl sulfone and hexafluorobisphenol A, provide significant advantages over conventional polysulfones (e.g., non-fluorinated polysulfones) and/or mixtures of conventional polysulfones with fluorinated resins, as shown by improved heat release and optical characteristics.

The polysulfones of the invention may be advantageously used in aircraft applications such as, for example, passenger service units, staircases, window reveals, ceiling panels, information displays, window covers, ceiling panels, sidewall panels, wall partitions, display cases, mirrors, sun visors, window shades, storage bins, storage doors, ceiling overhead storage lockers, serving trays, seat backs, cabin partitions, and ducts. The polysulfones of the invention also provide substantial advantages in transparent articles such as windows, lighting fixtures and partitions are especially well suited for polysulfones and compositions containing polysulfones.

Obviously, numerous modifications and variations of the present invention are possible in light of the above teachings. It is therefore to be understood that within the scope of the appended claims, the invention may be practiced otherwise than as specifically described herein.

The invention claimed is:

1. A polysulfone copolymer, consisting of:
   first and second repeating sulfone units and one or more terminal groups, wherein the repeating sulfone units consist of:
   first sulfone units made of bonded units of a biphenol group and a diphenylsulfone group of formula I,

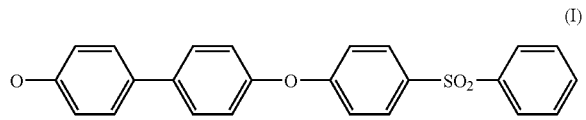

and
   second sulfone units made of bonded units of a hexafluorobisphenol A group and a diphenylsulfone group of formula II

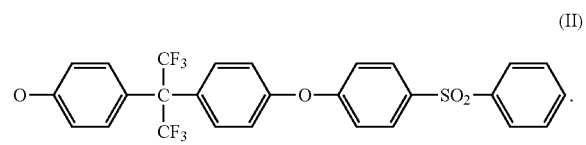

2. The polysulfone copolymer of claim 1, wherein the first and second sulfone units are present in a ratio of 1:0.01-100.

3. The polysulfone copolymer of claim 1, having a light transmittance greater than 80% according to ASTM D-1003.

4. The polysulfone copolymer of claim 1, having a total heat release of less than 50 kW·min/m², according to the OSU flammability test.

5. The polysulfone copolymer of claim 1, having a peak heat release of less than 50 kW/m², according to the OSU flammability test.

6. The polysulfone copolymer of claim 1, having a color factor of less than 150 or less when measured on a molded plaque defined in ASTM-1278 when molded.

7. A process for manufacturing the polysulfone copolymer of claim 1, comprising :
   reacting a mixture comprising 4,4'-biphenol, hexafluorobisphenol A, and 4,4'-dichlorodiphenylsulfone, in the presence of a molar excess of potassium carbonate.

8. A polymer blend composition, comprising:
   the polysulfone copolymer of claim 1 and one or more materials selected from the group consisting of an additional thermoplastic material, a dye and a pigment.

9. A transparent article comprising the polysulfone copolymer according to claim 1.

10. A transparent sheet, comprising the polymer blend composition of claim 8 in the form of an extruded sheet.

11. The polysulfone copolymer of claim 1, wherein the first and second sulfone units are present in a ratio of about 1.

12. The polysulfone copolymer of claim 1, wherein the first and second sulfone units are present in a ratio of 0.01 - 0.4.

13. The polysulfone copolymer of claim 1, wherein the first and second sulfone units are present in a ratio of 2 - 100.

* * * * *